United States Patent
Levine et al.

(10) Patent No.: US 12,319,080 B2
(45) Date of Patent: Jun. 3, 2025

(54) IDENTITY AUTHENTICATION AND PROCESSING

(71) Applicant: Berbix LLC, Tahoe Village, NV (US)

(72) Inventors: Eric Levine, San Francisco, CA (US); Stephen Kirkham, San Francisco, CA (US)

(73) Assignee: Socure, Inc., Incline Village, NV (US)

( * ) Notice: Subject to any disclaimer, the term of this patent is extended or adjusted under 35 U.S.C. 154(b) by 678 days.

(21) Appl. No.: 17/637,424

(22) PCT Filed: Jul. 27, 2020

(86) PCT No.: PCT/US2020/043672
§ 371 (c)(1),
(2) Date: Feb. 22, 2022

(87) PCT Pub. No.: WO2021/040938
PCT Pub. Date: Mar. 4, 2021

(65) Prior Publication Data
US 2022/0277066 A1 Sep. 1, 2022

Related U.S. Application Data

(60) Provisional application No. 62/891,258, filed on Aug. 23, 2019.

(51) Int. Cl.
*B42D 25/309* (2014.01)
*G06F 21/36* (2013.01)
(Continued)

(52) U.S. Cl.
CPC ........... *B42D 25/309* (2014.10); *G06F 21/36* (2013.01); *G06F 21/45* (2013.01); *G06V 10/751* (2022.01);
(Continued)

(58) Field of Classification Search
CPC ....... B42D 25/309; G06F 21/36; G06F 21/45; G06V 10/751; G06V 40/16; G06V 40/172; H04W 12/06
See application file for complete search history.

(56) References Cited

U.S. PATENT DOCUMENTS 10,037,460 B2 7/2018 Eckel et al.
2003/0086591 A1 5/2003 Simon
(Continued)

OTHER PUBLICATIONS

European Search Report issued in application EP20857496.2 dated Aug. 1, 2023.
(Continued)

*Primary Examiner* — Casey L Kretzer
(74) *Attorney, Agent, or Firm* — Charles B. Lobsenz; Brian H. Buck; Potomac Law Group, PLLC

(57) ABSTRACT

Methods, systems, and devices are provided for an authentication system configured to verify the identity of a person. According to one aspect, the system can determine that a first set of image pixels contains a first side of an authentication document. The system can determine that a second set of image pixels contains a second side of an authentication document. The system can determine whether the first side of the authentication document of the first image and the second side of the authentication document match. The system can compare a third image with the first image and determine whether the third image and the first image match to the same person. And the system can perform each step of authentication after receiving an image and prior to requesting more images from the user, reducing the overall processing time.

32 Claims, 9 Drawing Sheets

(51) Int. Cl.
    *G06F 21/45*          (2013.01)
    *G06V 10/75*          (2022.01)
    *G06V 40/16*          (2022.01)
    *H04W 12/06*         (2021.01)

(52) U.S. Cl.
    CPC ............ *G06V 40/16* (2022.01); *G06V 40/172*
                   (2022.01); *H04W 12/06* (2013.01)

(56) References Cited

U.S. PATENT DOCUMENTS

| | | | | |
|---|---|---|---|---|
| 2013/0155474 | A1* | 6/2013 | Roach | G06V 10/243 |
| | | | | 358/473 |
| 2015/0139506 | A1* | 5/2015 | Wang | G06V 30/133 |
| | | | | 382/112 |
| 2016/0098093 | A1* | 4/2016 | Cheon | H04N 21/41265 |
| | | | | 345/156 |
| 2016/0104041 | A1 | 4/2016 | Bowers et al. | |
| 2017/0286765 | A1 | 10/2017 | Rodriguez | |
| 2017/0351909 | A1 | 12/2017 | Kaehler | |
| 2019/0042719 | A1* | 2/2019 | Miu | H04L 63/0861 |
| 2019/0205634 | A1* | 7/2019 | Mayer | H04N 23/64 |
| 2019/0251774 | A1 | 8/2019 | Ladrón et al. | |
| 2019/0281036 | A1* | 9/2019 | Eisen | G06F 21/31 |
| 2019/0333117 | A1* | 10/2019 | Lee | G06Q 20/10 |
| 2022/0052996 | A1* | 2/2022 | Sjöholm | H04L 63/0861 |
| 2022/0150374 | A1* | 5/2022 | Ohara | H04N 1/00331 |

OTHER PUBLICATIONS

International Search Report in PCT Application No. PCT/US2020/043672, dated Oct. 27, 2020.

\* cited by examiner

IDENTITY AUTHENTICATION AND PROCESSING

CROSS-REFERENCE TO RELATED APPLICATIONS

This application is a 371 U.S. National Stage application of International Application No. PCT/US2020/043672, filed on Jul. 27, 2020, which claims the benefit of U.S. Provisional Patent Application No. 62/891,258, filed on Aug. 23, 2019, the contents of which are incorporated herein by reference in their entirety.

BACKGROUND

Current methods used to detect and protect against fraudulent identification is conducted by a slow process. The number of online identification verification requests is on the rise and systems have been created to simulate a verification of a person and the confirming the legality of the transaction, such as a human agent verifying a person of legal age or status by physically checking the person's identification document. Typically, a person in the physical world who needs to be screen or verified for a transaction will take out a physical identification document, such as a driver's license, state-issued identification card, or passport, show it to a human agent on the other side of the transaction to verify both the legality and identity of the person so that the person is who she claims she is, and that the transaction is legal. The verification transaction typically takes a few seconds.

Current systems to verify the identity of a person by a virtual system are both slow and insecure from fraud. An improved way to verify the identity of a person both securely and quickly is greatly needed with more online transactions happening every day.

BRIEF SUMMARY

The present disclosure relates generally to systems and methods for verifying the identity of a person. In one aspect, an authentication system can be configured to verify the identity of a person. According to one aspect, the system can receive a first image having a first set of image pixels. The system can determine that the first set of image pixels contains a first side of an authentication document having an image of a face and one or more identification indicators.

In one aspect, the system can determine that the first set of image pixels includes an entirety of the first side of the authentication document. The system can determine that the first side of the authentication document is optically machine readable. In one aspect, the one or more identification indicators can include facial features of a person associated with the authentication document. The system can extract the facial features of the person associated with the authentication document. In one aspect, the one or more identification indicators can include an identification class, document class, or identification type. In one aspect, the system can determine the identification class, document class, identification type, or a combination thereof. The one or more identification indicators can include character text, number text, symbols, signatures, engravings, or a combination thereof. In one aspect, the system can extract and analyze the character text, number text, symbols, signatures, engravings, or a combination thereof. The one or more identification indicators can include one or more document identification numbers. The system can extract the one or more document identification numbers. The one or more identification indicator can include one or more name fields, date of birth fields, document expiration dates, or a combination thereof. In one aspect, the system can extract the one or more name fields, date of birth fields, document expiration dates, or a combination thereof. In one aspect, the system can determine that the first image received is that of a capture image from an image capture device. The system can determine that the first image received is that of a physical authentication document. And the system can determine that the authentication document is compliant with at least one document issuing authority.

In one aspect, the system can receive a second image having a second set of image pixels. The system can determine that the second set of image pixels contains a second side of an authentication document of the second image having one or more identification indicators. The system can further determine that the second set of image pixels includes an entirety of the second side of the authentication document of the second image. The system can further determine that the second side of the authentication document of the second image is optically machine readable. In one aspect, the one or more identification indicators can include a barcode associated with the authentication document of the second image. The barcode can be a single or multidimensional code. The barcode can be a PDF417 compliant barcode. The system can further decode and analyze the barcode of the authentication document of the second image. The system can further detect, based on analyzing the decoded barcode, one or more identification fields in the authentication document of the second image. In one aspect, the one or more identification fields can include an identification class, document class, identification type, or a combination thereof. In one aspect, the one or more identification fields can include character text, number text, symbols, signatures, engravings, document identification number, name fields, date of birth fields, document expiration date fields, or a combination thereof.

In one aspect, the system can further compare the one or more identification fields of the second side of the authentication document of the second image with the one or more identification indicators of the first side of the authentication document of the first image, determine that the one or more identification fields of the second side of the authentication document of the second image matches the one or more identification indicators of the first side of the authentication document of the first image; and verify that the first side of the authentication document of the first image and the second side of the authentication document of the second image are associated with a same document. The system can further determine that the second image received is that of a capture image from an image capture device. The system can further determine that the second image received is that of a physical authentication document. And the system can further determine that the second side of the authentication document of the second image is compliant with at least one document issuing authority.

In one aspect, the system can determine whether the first side of the authentication document of the first image and the second side of the authentication document of the second image are associated with a same document.

In one aspect, the system can receive a third image having a third set of image pixels. The system can determine that the third set of image pixels contains a face. The system can further separate a background of the third image from the face, separating one or more portions of the third image that are not the face, or a combination thereof. The system can further determine that the third image is a capture image from an image capture device. And the system can further determine that the capture image of the third image is not a screen shot of the capture image.

In one aspect, the system can compare the face of the third image with the image of the face of the first image and determine whether the third image and the first image are associated with different persons or the same person. The system can detect whether the face of the third image is an identical copy of the image of the face of the first image.

And the system can verify an identity of the person based on at least, in part, one of the first, second, and third images.

In one aspect, the system can receive a fourth image, based on a set of instructions given to a user, having a fourth set of image pixels. The system can determine that the fourth set of image pixels contains a face. The system can determine, based on one or more detected features of the face, whether the set of instructions given to the user have been satisfied. The system can compare the face of the fourth image with the face of the third image. The system can further separate a background of the third image from the face of the third image, separate a background of the fourth image from the face of the fourth image, compare the background of the third image with the background of the fourth image, and determine whether the backgrounds of the third and fourth images are associated with a same spatial environment, a same or similar temporal environment, or a combination thereof. The system can further generate a machine learning model configured to determine the spatial environment of a background of an image and determine whether the background of the third image and the background of the fourth image are the same spatial environment. And the system can determine whether the fourth image and the third image are associated with different persons or of the same person.

And in one aspect, the same authentication document can be a personal identification document including a driver's license, identification card, or a passport.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Illustrative embodiments are described with reference to the following figures.

DETAILED DESCRIPTION

Figure 1:
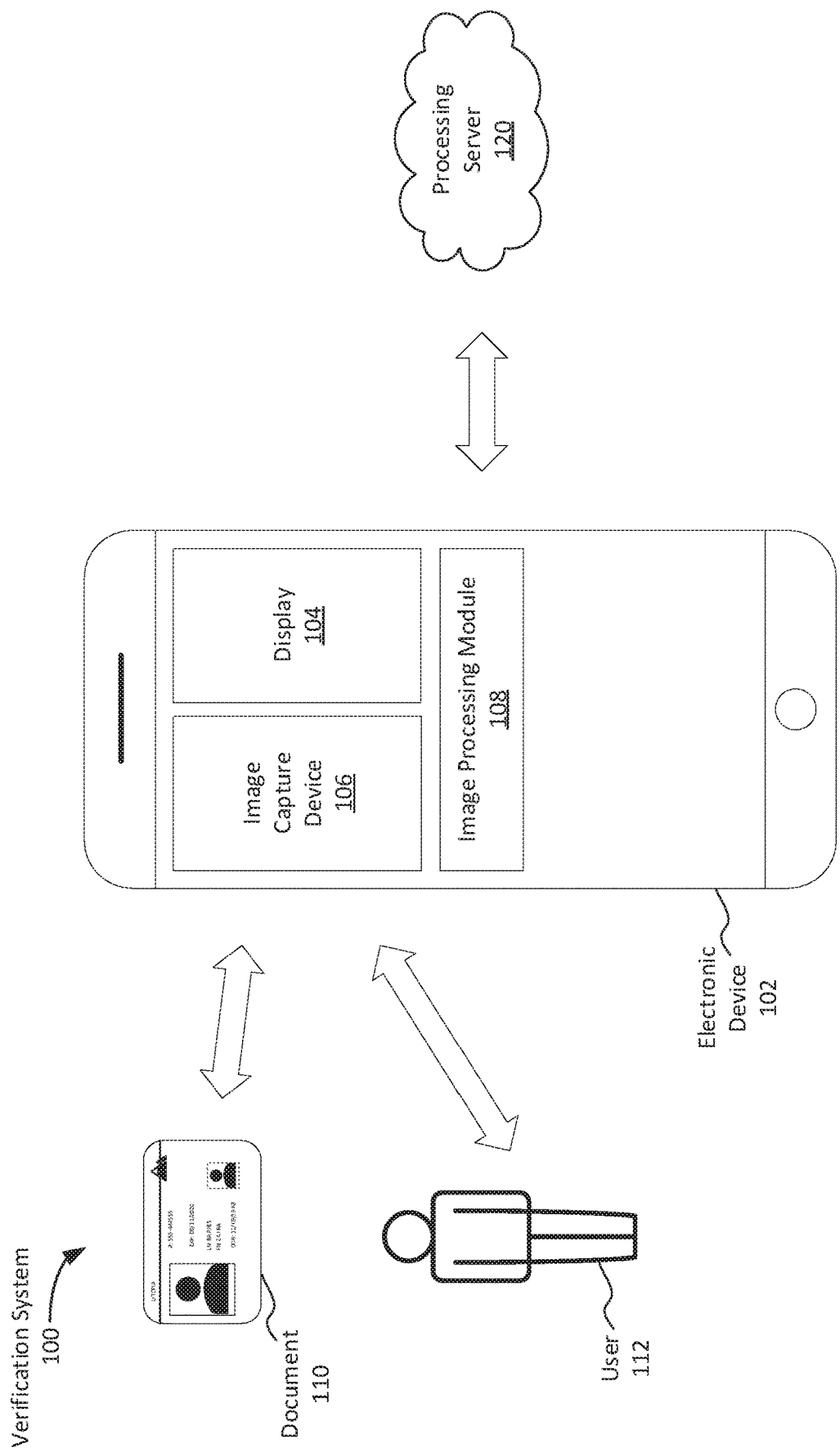
FIG. 1 is a schematic illustration of a computer system for verifying a person in accordance with various aspects of the subject technology.

According to certain embodiments, methods and systems disclosed herein relate to authenticating an identity and processing.

In this specification, reference is made in detail to specific embodiments of the invention. Some of the embodiments or their aspects are illustrated in the figures. For clarity in explanation, the system has been described with reference to specific embodiments, however it should be understood that the system is not limited to the described embodiments. On the contrary, the system covers alternatives, modifications, and equivalents as may be included within its scope as defined by any patent claims. The following embodiments of the system are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the system.

In addition, it should be understood that steps of the exemplary system and method set forth in this exemplary patent can be performed in different orders than the order presented in this specification. Furthermore, some steps of the exemplary system and method may be performed in parallel rather than being performed sequentially.

A computer implemented system and method for verifying the identity of a person is described.

Generally, a typical online verification system will require a user to upload one or more photographs of the person's physical identification card ("ID card"), and one or more photographs of the person's face The system will then determine whether the photograph uploaded can be properly read and verify the contents.

However, there are both temporal and security constraints with the current system. In this case, if a person is prompted to upload the back side of her ID card, but uploads a blurry or out of focus image, or an image that is not optically readable by a camera and image processing application, the user may be prompted to reset the verification process and upload both a front side and back side of her ID card again. This process drastically increases the amount of time it takes for a transaction requiring ID verification and just an increase of just a few dozen seconds can be cumbersome. In some instances, the computation time can take minutes and hours to finish. The current process is extremely cumbersome to many types of businesses that need online verification and in other instances not viable to some business due to the computational and time cost.

The following discussion generally describes system and methods for verifying the identity of a person.

A. Identity Authentication and Processing

An identity authentication and verification system is described herein.

A computer implemented system described below, generally, verifies an identification document and authenticates the document. The system verifies and authenticates one or more images of a user. And the system associates one or more images of the user with the document.

FIG. 1 illustrates a system architecture of a computer implemented system for verifying and authenticating an identity of a person. As illustrated in FIG. 1, a verification system 100 includes, a display 104, an image capture device 106, and image processing module 108. The electronic device 102 is linked to a to a remove server, or processing server 120. The electronic device 102 can send and receive image capture information to processing server 120. The image capture device 106 can be a camera configured to capture images with resolutions high enough to read information on a physical identification card. For example, the camera can capture images from a document 110, such as an ID card, with high enough resolution to read any barcode, text, designs, or, symbols on an ID card, detect a human face and background images of a self-portrait photograph of a human or user 112, detect features of a human face from the self-portrait, or a combination thereof. In one example, the information in the image captured can include an image of a signature associated with the identified person in the identification document. The information in the image captured can include a barcode presented in a format compliant with guidelines set by the issuing authority, or standards organization, or both. In one example, the information in the image captured can include a date of birth or address associated with the identified person in the identification document. In one example, the electronic device 102 can be a mobile device such as a smart phone or a computer tablet. In one example, the electronic device can be any electronic device that can be interacted with a person such as a laptop or computer.

In one example, the image processing module 108 can be stored internally in the electronic device. The image processing module 108 can process images including detecting and determining classes of images taken by the image capture data, or other images uploaded to the electronic device. For example, the electronic device 102, via an application of the device can request one or more verification images from a user of the device. The user obtain the one or more verification images from the electronic device 102 via the image capture device 106. If the one or more verification images are images of an identification card or a self portrait of the user, the image processing module 108 can detect that the one or more images includes an image of a self-portrait or one or more images of an identification card.

The processing server 120 is configured to process images captured by the image capture device 106. The processing server is also configured to process images after the image processing module 108 has processed the images and perform tasks both after the processing module 108 has performed its tasks and in parallel with tasks performed by image processing module 108.

Figure 2:
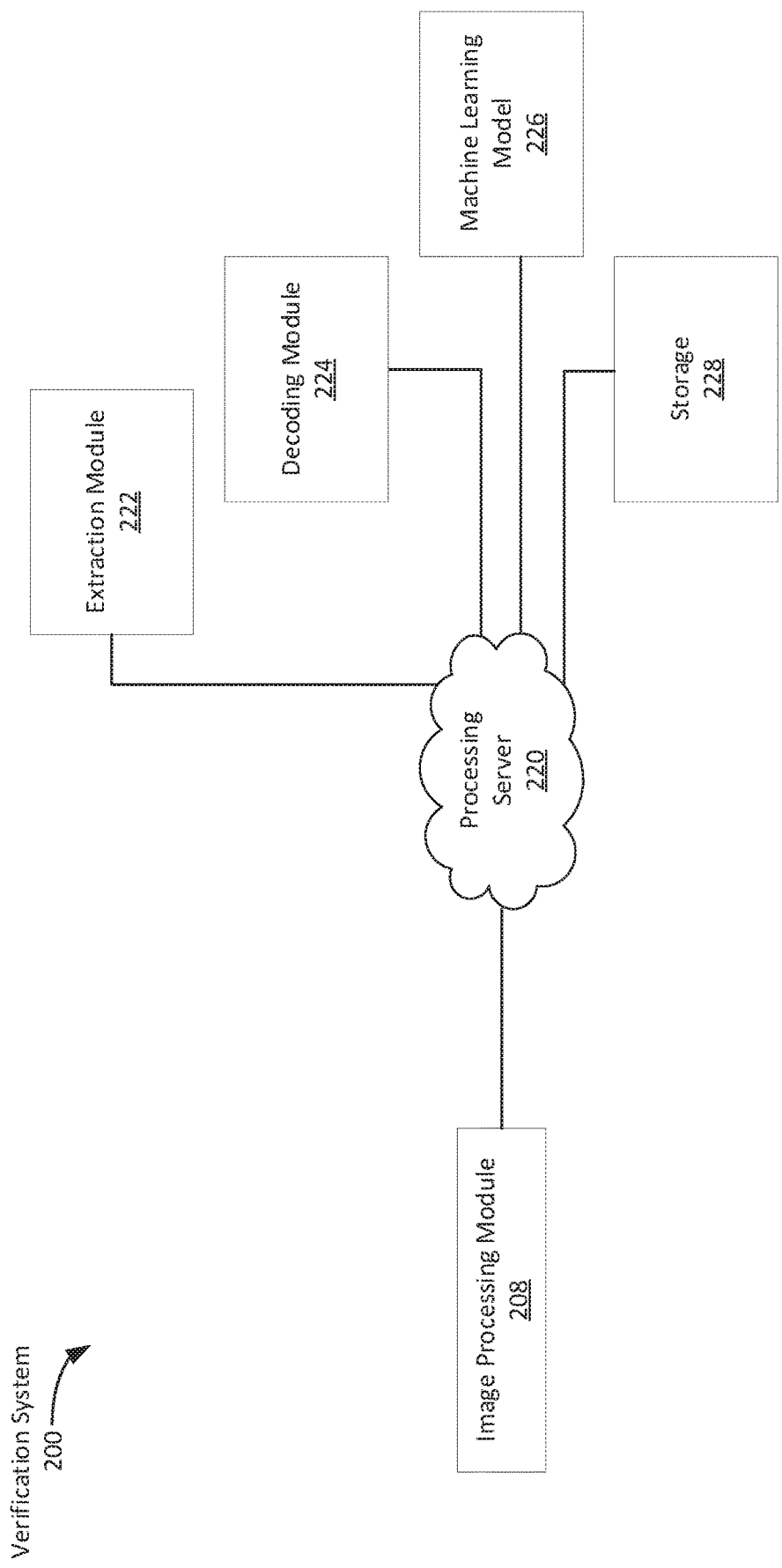
FIG. 2 shows an additional schematic illustration of a computer system for verifying a person in accordance with various aspects of the subject technology.
Figure 3:
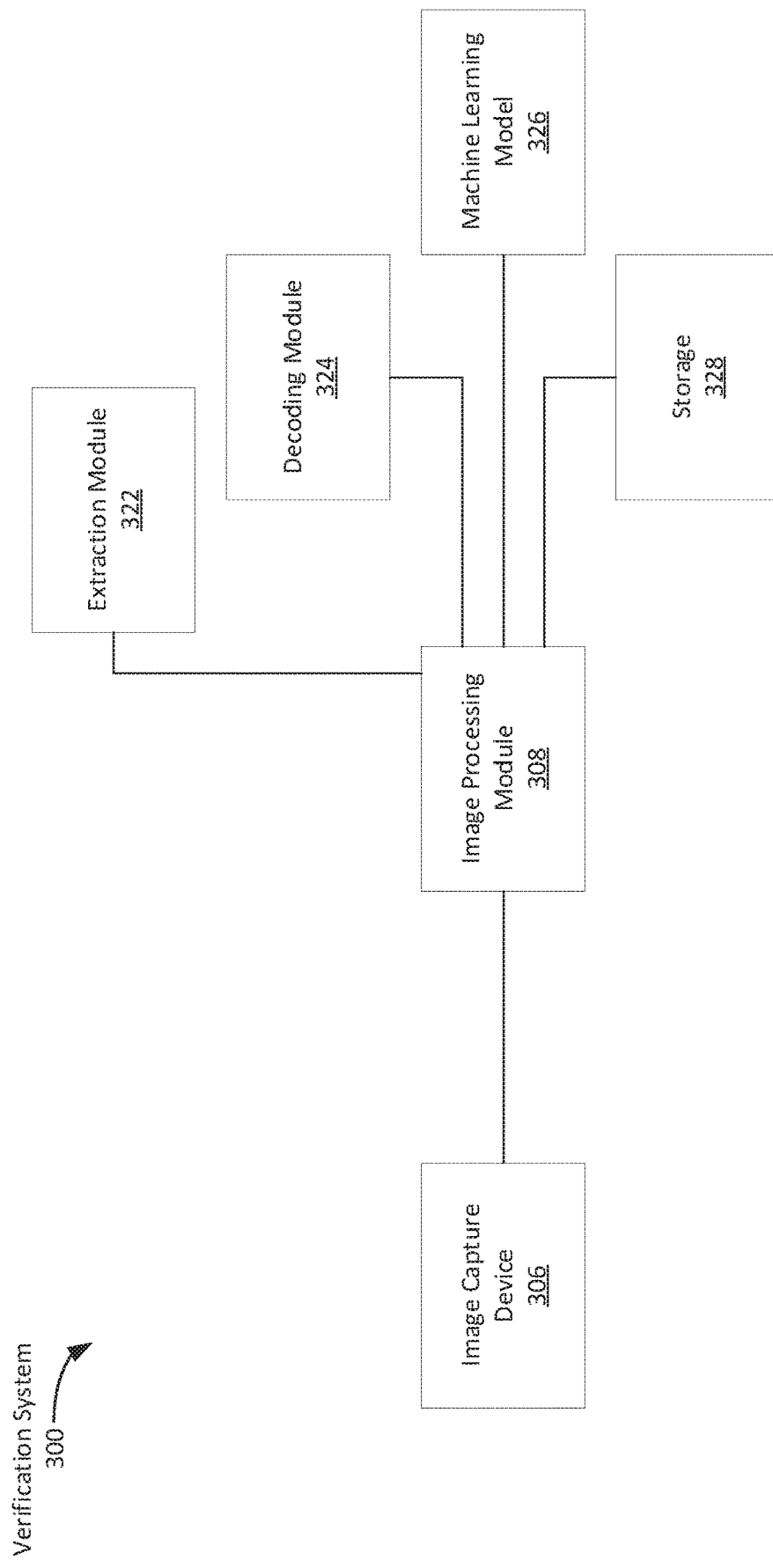
FIG. 3 illustrates an additional schematic illustration of a computer system for verifying a person in accordance with various aspects of the subject technology.

FIGS. 2 and 3 illustrate additional system architectures for verifying an identity of a user similar to that of verification system 100 of FIG. 1. As illustrated in FIG. 2, verification system 200 includes an image capture device 306 of an electronic device, such as a camera of a mobile phone or laptop, that can capture one or more images of identification documents or one or more images of self-portraits of a user. The captured images are sent to a image processing module 208 which can process one or more images such as detect a class or type of image received. The one or more images can then be sent to a processing server 220 to further process the one or more images. In one example, the processing server 220 is configured with an extraction module 222 to extract identification features in identification or authentication documents such as features of images, such as text, barcodes, symbols, photographs, faces, facial features, etc. The processing server 220 can also be configured with a decoding module 224 configured to decode one or more barcodes, generate a payload from the barcode and extract features from the payload, such as identification features in identification or authentication documents. The processing server 220 can also be configured with a machine learning model 226 to receive images and identify patterns or features of the images received. The images can be compared to a training set of images with certain patterns or features to predict whether the received images share features similar to that of the training images. For example, the machine learning model 226 of processing server 220 can receive images of a plurality of self-portraits and detect whether the backgrounds of the self-portraits are the same or indicate a same location of each of the self-portraits made. In another example, the machine learning model 226 can be configured to detect, based on features of images such as the outlines, semantically segmented components of a photograph, color palette of the photograph, etc., whether images received are images of actual images captured by a camera of a mobile device instead of screenshots or capture images of images, instead of authentic self-portraits taken moments before a request for one or more self-portrait images. The processing server 220 can also be configured with a storage 228, or storage unit, configured to store training data, store images received.

In one example, the extraction module 222, decoding module 224, machine learning model 226 can each be located in servers different than that of processing server 220. When tasks are to be performed by one of extraction module 222, decoding module 224, machine learning model 226, or a combination thereof, the processing server 220 will assign the task to each of the other modules and send relevant information to the individual modules. In another example, each of the extraction module 222, decoding module 224, machine learning model 226 are part of the processing server 220 and perform tasks at the processing server 220.

In one example, as illustrated in FIG. 3, a verification system 300 can include an extraction module 322, decoding module 324, machine learning model 326 such that each module embedded in an image processing module 308 of an electronic device. The processing tasks such as extracting features of a image captured by image capture device 306 and processing the image can be done locally by the electronic device or by the processing server.

The following discussion is an example process by verification system similar to that of verification system 100, 200, or 300, for verifying an identity of a person.

In one example of a verification system 100, an electronic device 102 can request images from a user including a first side of an identification document and a second side of an identification document, and a photograph of a self-portrait. An image processing module 108 and a processing server 120 connected to the image processing module 108 and the mobile device 102 can perform functions immediately after each individual image upload such that verification system 102 can prompt a user to capture an image, process images using image processing module 108, upload each image to processing server 120, which can then process individual images and determine relationships between images previously uploaded immediately after each image's submission to reduce the computational and time load for verifying a user.

In one example, in verification system 100, an electronic device 102, via the display 104 of the electronic device 102, can prompt a user to upload a first image of a first side of a document 110. The first side of an authentication document can be a first side, or front side of an ID card of the user that the verification system is attempting to verify and associate with the user. The user can take a picture of the front side of the document 110 and upload the document 110 to the electronic device. At this stage, the image processing module 108 can receive the first image and determine whether document is legible, whether the full document of the first side of the document 110 is in view of the first image, or whether the image is optically machine readable. The system, via the image processing module 108 or processing server 120 can also detect whether there are text, symbols, or other features of the document, whether there is a picture of a human face in the document 110 or a combination thereof. If a number of the above described are unsatisfactory, such that the verification system 100 cannot determine that the first image is in fact an image of a first side of a document, or that only a portion of a first side, and not the entirety of the first side, of a document is detected, the verification system 100, can request a new image from the user so that the system will receive another image of a first side of a document 110. If the verification system 100 does determine that the first image is in fact an image of a first side of a document, then the system will prompt to perform the next step. Next, via the processing server 120, the verification system can extract features including identification indicators from the document. the system can extract features of the first side of the document 110. If the document 110 is an identification or an authentication document like that of a driver's license, identification card, passport, or similar document, the system can extract identification indicators from the first image. For example, the system can extract textual features relating to a class of identification such as a state issued driver's license, a sub class of identification from the class of identification such as the specific state indicated, type of identification such as a driver's license or a meal card, character text, and number text fields such as date of birth of the person associated with the document, age, height, name, expiration date of the authentication document, etc. The system can also detect and extract engravings for identifying the type or issuing agency or authority of the document, detect symbols, signatures, and other identification fields. The verification system 100 can then determine whether the features of the document or identification indicators of the document were adequately extracted. The determination of adequacy can include whether the text of the first side of the document was legible, any symbols, engravings, or pictures identifying a face or body of a person was optically machine readable, etc. If a number of the above described are inadequate, such that the system cannot determine a predetermined set of identification indicators that need to be determined, the verification system 100 can reject the first image, while having a first side of the document that was verified as an adequate document, but rejected because the document was not legible to extract the predetermined set of identification indicators and request a new image from the user. For example, a predetermined set of identification indicators that need to be satisfied in order for system to move on and not request another image of a first side of a document can include determining and extracting features of a face, facial features, in the image, determining and extracting a date of birth of a person associated with the document, determining and extracting a document identification number or document number (for example in a passport, the passport number), determining and extracting a first and last name of the person associated with the document, and an expiration date of the document. For example, once each and all of the content of the picture or photograph, date of birth, first and last name, ID number, and expiration date have been extracted, the system can move on to the next step, otherwise if will reject and ask for another, clearer or more legible, picture of the first side of the document so that the predetermined requirements can be extracted and satisfied. Note, the hypothetical description above is only an example and the predetermined threshold for determining that the extracted features or identification indicators are adequate to move on to a next step can be arbitrary and set to any number or combination of features.

In one example, the detection and determination of the identification indicators of the document can be generated by a machine learning model trained by example labelled documents with similar identification indicators. For example, the machine learning model can determine similarity of features of an identification card with the received image based on typography of the document, organization of the engravings, text, and images of the document, color, background features and color, and other characteristics that can link a verified and known document type with the received document. In another example, the detection and determination of the identification indicators of the document can be generated by heuristics that rely on the extraction of text to determine identification indicators. For example, to determine whether the class and subclass of a document is a state driver's license form the state of California, the document may have text that reads "Driver License" and "California". When these features are extracted from the image, the verification system 100 can indicate, with high probability the class and subclass of the document.

In one example, the verification system 100, via the processing server 120, can also detect and determine whether the image uploaded is that of a capture image from an image capture device. For example, whole prompted to upload a picture of a user's identification document 110, a bad actor could upload a screenshot of an ID card or take a photo of a photograph of an ID card. The processing server can determine whether the picture uploaded of the first side of the document is that of a physical identification document.

In another example, the processing server 120 can determine whether the authentication document is compliant with at least one document issuing authority. In one example, the processing server 120 can determine whether the authentication document is of an authentication document that is legally prohibited from electronic processing. For example, the verification system 100 can determine that the first side of the authentication document is a document of a military identification card and indicate a rejection of processing the image and either request a new image or indicate a mistaken or fraudulent action has taken place. In another example, the verification system 100 can determine that the first side of the authentication document is a document of a "sample" or "specimen" ID card proposed by an issuing authority, but not that of an actual ID card. Once processing server 120 determines that the card is not a real ID card, it can also reject the further processing of the first image uploaded and prompt a new image to be uploaded.

In one example, if the first side of the authentication document requested is satisfactory, the verification system 100 can prompt for a second image such that the image received is of a second side of document 110. In one example, the verification system can determine whether the document in the second image is legible such as if the contents of the image can be blurred or distorted by lighting or glares, whether there is a readable barcode in the image, whether the full document is in view of the second image, whether there is text, symbols, or other features of the document, or a combination thereof. If a number of the above described are unsatisfactory, such that the system cannot determine that the second image is in fact an image of a second side of a document, or in another example, a document at all, the verification system 100 can request a new image from the user so that the system will receive another image of document 110. If the system does determine that the second image is in fact an image of a second side of a document 110, or any side of a document, then the verification system 100 will prompt to perform the next step.

The verification system 100 can then extract features including identification indicators from the document. In this step, the system can extract feature of the first side of the document. If the document is an identification or an authentication document like that of a driver's license, identification card, passport, or similar document, the system can extract identification indicators from the second image. For example, the system can extract textual features relating to a class of identification such as a state issued driver's license, a sub class of identification from the class of identification such as the specific state indicated, type of identification such as a driver's license or a meal card, character and number text fields such as date of birth of the person associated with the document, age, height, name, expiration date of the authentication document, etc. The system can also detect engravings for identifying the type or issuing agency or authority of the document, detect symbols, signatures, and other identification fields. The verification system 100 can determine whether the features of the document or identification indicators of the document were adequately extracted. The determination of adequacy can include whether the text of the first side of the document was legible, any symbols, engravings, or pictures identifying a face or body of a person was optically machine readable, etc.

In one example, the determination of adequacy can include whether a barcode can be identified and scanned by the computer-implemented system. If a number of the above described are inadequate, such that the system cannot determine a predetermined set of identification indicators that need to be determined, or that the barcode cannot be decoded due to a barcode not existing in the second image or not readable, the verification system 100 can reject the second image having a second side of the document that was verified as an adequate document but not legible to extract the predetermined set of identification indicators and request a new image from the user.

For example, a predetermined set of identification indicators that need to be satisfied in order for the system to move on and not request another image of a second side of a document can include identifying a barcode and extracting features of the barcode and decoding the bar code. In this example, once a barcode is identified and decoded, an adequate barcode, at least in form, format, and style, but not necessarily in content, along with a proper decoding of the barcode will generate a payload of the barcode such that the system can read text and number of the payload associated with the barcode.

In this example, if the barcode cannot be decoded or cannot generate a payload of the barcode, the system will reject the second image and request another new image from the user. The hypothetical description above is only an example and the predetermined threshold for determining that the extracted features or identification indicators are adequate to move on to a next step can be arbitrary and set to any number or combination of features. In one example, the barcode can be a single or multidimensional code. The bar code can also be a PDF417 compliant barcode.

Additionally, the verification system 100 can determine whether the first side of the document of the first image and the second side of the document of the second image are associated with a same document. In this step, once an adequate barcode is identified, decoded, and a payload is generated, the verification system 100 can identify identification indicators in the payload, like that of the identification indicators from the first image of a first side of a document. For example, the verification system 100 can determine whether certain identification indicators are present in the payload of the second image of the second side of the document including determining and extracting a date of birth of a person in the payload, determining and extracting an identification or document number (for example in a passport, the passport number), determining and extracting a first and last name of the person, an expiration date in the payload, or a combination thereof. Once any or all of the date of birth, ID number, first and last name, or expiration date are extracted from the payload, the verification system 100 can compare the above identification indicators with that of the identification indicators identified from the first image of the first side of the document. If the identification indicators from the first image and a second image are a match, then the verification system 100 can determine that the first image and the second image are a first and second side of a same identification document. If the identification indicators are not a match, either in its entirety or individual identification indicator, then the verification system 100 can determine either that the first image and second image uploaded to the verification system 100 are of different documents and indicate that a fraudulent action has taken place, or that at least one of the first image or second image is of a picture of a fraudulent or invalid document. If the first and second image are a match, the verification system 100 can move forward to the next step. If the images do not match, the verification system 100 can indicate that a mistake, error, invalidity, or fraud has taken place. In one example, the verification system 100 may prompt the user to upload a new image of a second side of a document.

In one example, the verification system 100, via the processing server 120, can also detect and determine whether the second image uploaded is that of a capture image from an image capture device. For example, while prompted to upload a picture of a user's identification document 110, a bad actor could upload a screenshot of an ID card or take a photo of a photograph of an ID card. The processing server can determine whether the picture uploaded of the first side of the document is that of a physical identification document.

Once the system has extracted an adequate number of features or identification indicators and has determined that the first image and second image as both associated with the same document, the verification system 100 can move to a next step.

In one example, the verification system 100 can request a third image from the user via the electronic device 102. The third image requested can be that of a self-portrait image, or a selfie image, of the user. The verification system 100 can determine that the third image contains a face of a human. The verification system 100 can determine whether the third image in fact has an image of a face and that the face is legible, such that features of the face can be adequately extracted. If the verification system 100 cannot determine that the third image is in fact an image of a face or a face with optically readable features, or that there are more than one faces in the picture, verification system 100 can request a new image from the user so that the system will receive another image of the face. If the verification system 100 does determine that the third image is in fact an image of a face, the system will prompt to perform the next step.

The verification system 100 can compare the face of the third image with the image of the face of the first image and determine whether the third image and the first image are associated with different persons or of a same person. Verification system 100 will extract features of the face as to identify a unique person associated with the face. Verification system 100 can compare the features of the face with the features extracted of the face from the first image, even if the images are not identical, and determine whether the two faces from the first image and the second image are associated with the same person. If the verification system 100 determines that the two faces are not of the same person, the verification system 100 can request another image from the user. Alternatively, if the system determines that the two faces are not of the same person, the system can indicate that a fraudulent action has taken place, since the face analyzed in the third image requested does not match the face analyzed from the first image. If the system determines that there is a match between the face analyzed in the third image and the face analyzed in the third image, the system can perform the next step.

The verification system 100 via the processing server 120 can also determine whether the image uploaded is in fact a capture image of a self-portrait, instead of a photo of a face, a screenshot of a face from another device or online medium. In one example, the verification system 100 can also detect whether the third image is a photograph of the photograph in the document. For example, a bad actor can take a photograph with the actor's camera of the same photo embedded in photo portion of the first image. While the first image and third image will match and indicate that the two images are associated with the same face, the verification system 100 can specifically reject this kind of third image and indicate a mistake, fraud, request for a new self-portrait photo, or a combination thereof.

Once the system recognizes that there is a match between the third image and the first image, as well as a match of content between the second image and the first image, the system can verify the identity of the person. In this case, the system can indicate that the first side of the document in the first image is associated with the same document as that of the second side of the document in the second image, that the document is an identification or authentication document, and that the third image is of a person associated with the person associated with the identification document.

In one example, a further step can be performed by the verification system 100 to enhance the security and accuracy of the verification process described above. In this example, the verification system 100 can request to receive a fourth image having image pixels that contains a face. The image can be another self-portrait image similar to, but not identical to that of the self-portrait image of the third image. Instead, the prompt for the fourth image will include one or more rules that the user is encouraged to abide by. Generally, the rules for taking the fourth image will require to the user to take an action such that the self-portrait taken will not look the exact, for example in terms of expression or configuration, from that of the third image. For example, the rules can include, but not limited to, requesting the user make a pose or expression that was different from the expression in the third image. The poses and expressions requested can be that of a surprise expression, angry expression, happy expression and so forth. The poses can be that of a side view of the face of the user or a top view where the user looks up, or a bottom view where the user looks down at the camera.

In this example, the verification system 100 via the processing server 120, can compare the fourth image with the third image to detect whether the images are associated with the same person. In one example, the verification system 100 can detect the similarity by extracting the background from both self-portraits of the third image and the fourth image and compare the similarity of the background. If the background images are similar, such that each of the backgrounds have the same or similar spatial environment, a same or similar temporal environment, or both, than the verification system 100 can indicate with a certain probability that the images are of the same person, or at least of the same location and time. In another example, the verification system 100 can detect the similarity by a machine learning model configured to determine the spatial environment of a background of a self-portrait and determine whether two backgrounds of two self-portraits are similar. In another example, verification system 100 can compare the facial features of the face of each of the third image and fourth image directly and indicate with a probability whether the two faces match to the same person. This verification step adds another security layer and fraud-proof layer from preventing a bad actor from scraping a genuine photo of a person from the internet and not of a live self-portrait taken moments after the request. Generally, a bad actor cannot find two very similar photos of self-portraits where one photo is a plain self-portrait, and another is a self-portrait with a specific pose or expression taken moments after the plain self-portrait. Once the third and fourth images are corroborated, the first, third and fourth images are corroborated, and the first and second images match to the same document, and the document is genuine, the verification system 100 can indicate that the user is verified and properly associated with the verified authentication document.

Figure 4A:
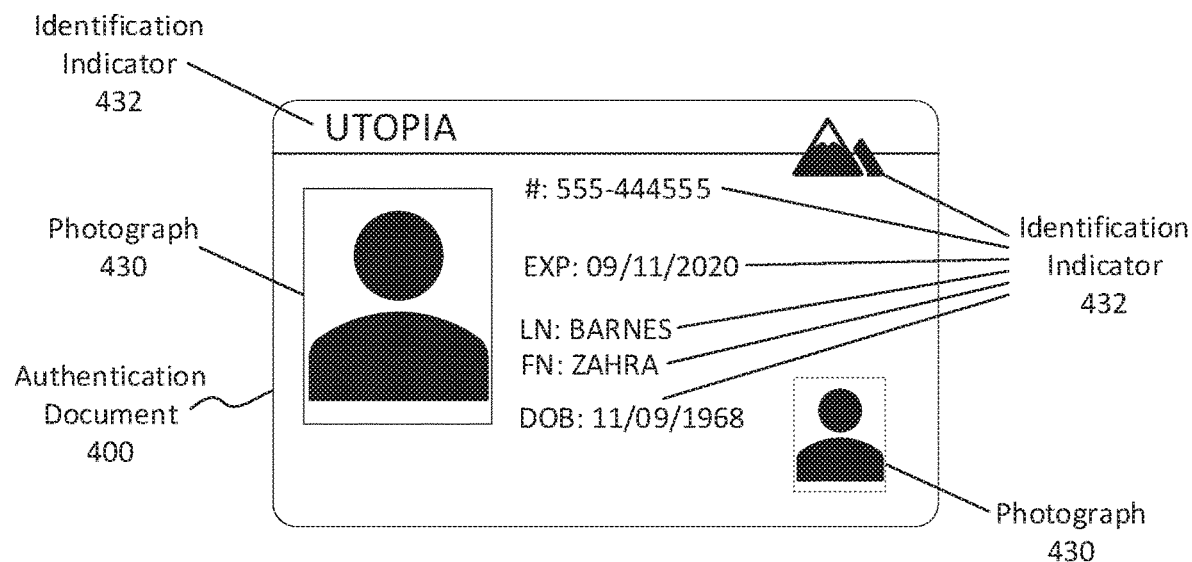
FIGS. 4A-4B illustrate example identification documents including various identification indicators in accordance with various aspects of the subject technology.
Figure 4B:
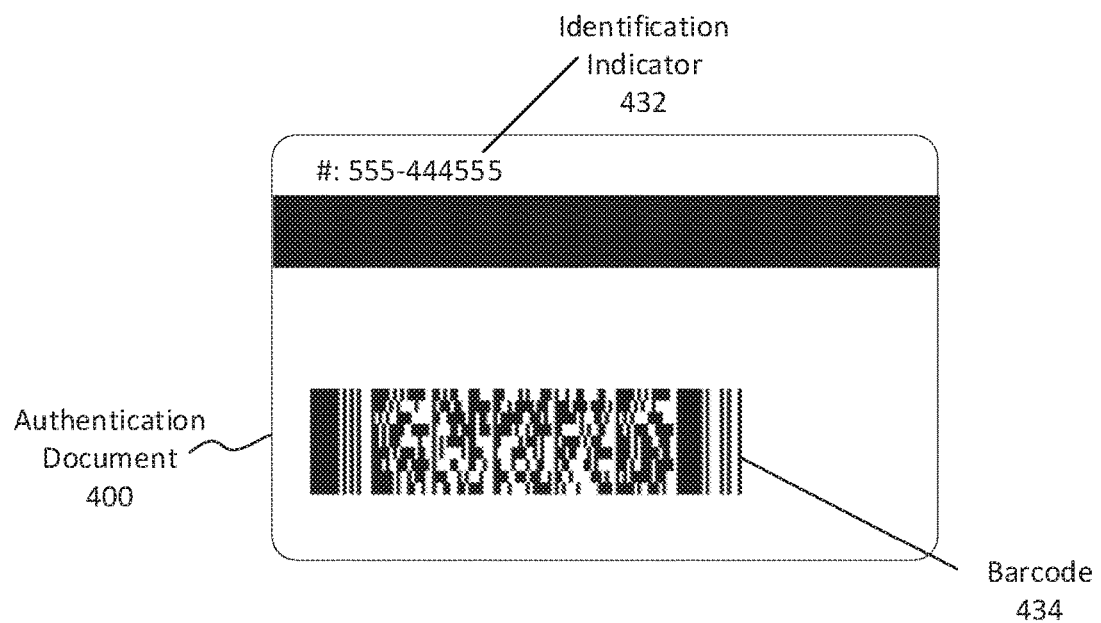

FIGS. 4A-B illustrate example identification documents that a verification system like that of verification systems 100, 200, or 300, would request, analyze, and authenticate. As illustrated in FIG. 4A, a document can be an authentication document 400, such as an ID card, having various identification indicators 432 and one or more photographs 430. The identification indicators can include, but not limited to, indicators of character text and character numbers like that of an identification or documentation number, dates such as date of birth of the identified person, or expiration date or issuance date of the document, names and aliases of the document, title and name of the issuing authority or agency, type or class of document, etc. The identification indicators 432 can also include symbols, engravings, other typography, that can indicate an issuing authority. As illustrated in FIG. 4B, the authentication document can have a second side, or a back side to the document, such as an ID card, and include, but not limited to, a barcode 434 or rewriting of an identification indicator 432 from the previous side of the document.

For example, a standards organization, such as the American Associate for Motor Vehicle Administrators ("AAMVA") can publish specific types of identification indicator proposals for state agencies to have in their guidelines for each of the state agency's driver's licenses. The individual state agencies can then publish their own guidelines. And a compliant and authentic authentication document issued by such agency will have the identification indicators compliant with the guidelines.

For example, a standards organization for issuing ID cards can set a guideline or rule including a provision that requires all states to issue a driver's license with a compliant barcode. The state issuing the identification documents will issue ID cards embedded with a barcode unique to the particular ID card with information about the person identified in the ID card. The barcode will likely comply with a particular barcode format such as the PDF417 barcode format.

In this example, the barcode 434 will likely contain information in the barcode's payload at least one of the same identification indicators as that of identification indicators of the front side of the document illustrated in FIG. 4A. The data payload associated with the barcode can include strings of text and numbers associated with the barcode having various fields including authentication information and personal identification information. For example, it can include text related to an identification number, expiration and issuance date, first and last name of the person identified, date of birth or addresses, any code text to describe engravings or classes or subclasses of the identification card, or a combination thereof. The payload of a genuine authentication document 400 such as an ID card will contain information that matches identification indicators of the front of the ID card.

B. Flow Process

The following examples illustrate flow process for verifying an identity of a person.

Figure 5A:
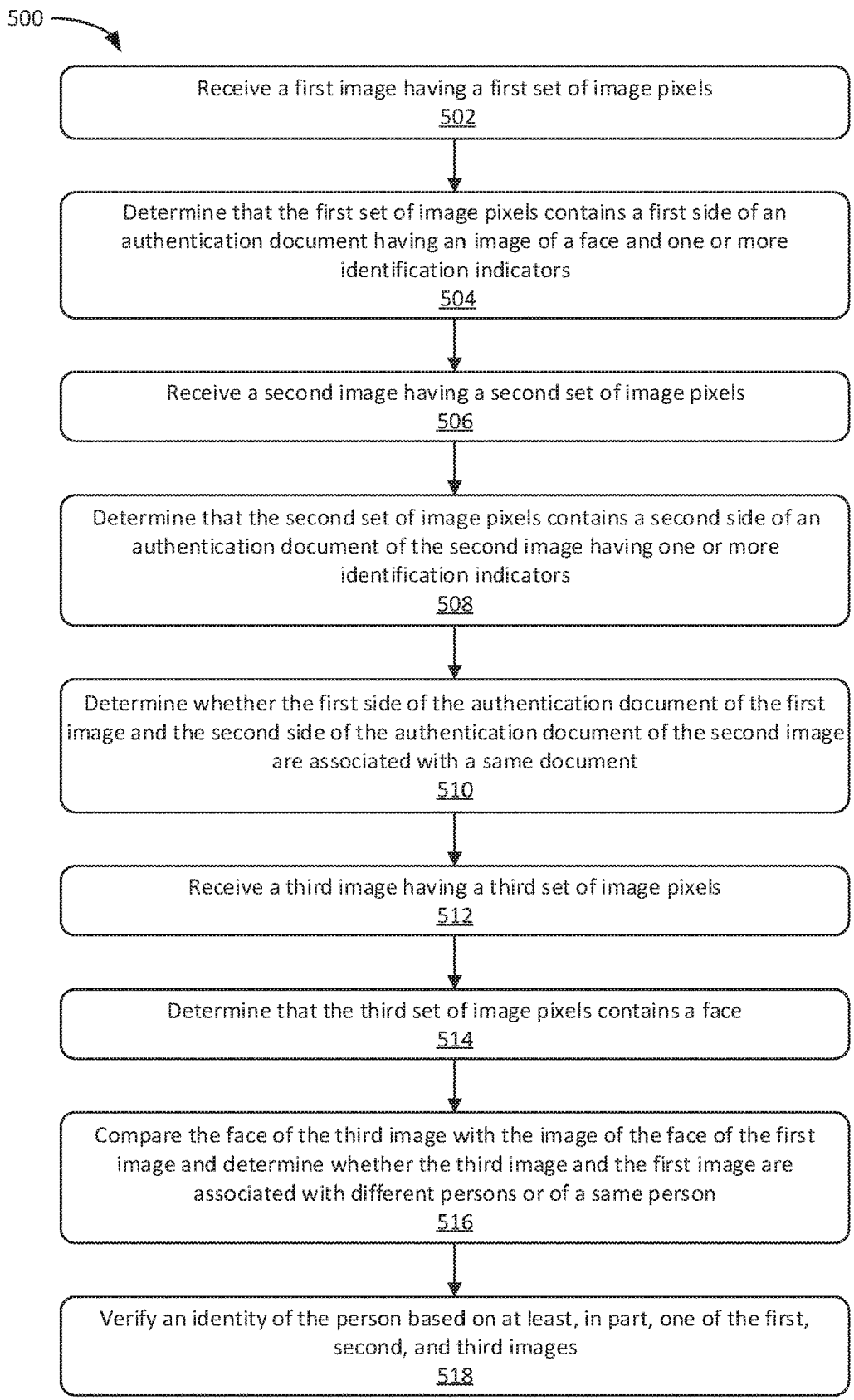
FIGS. 5A-5B illustrate flow diagrams of example processes for verifying an identity of a person in accordance with various aspects of the subject technology.
Figure 5B:
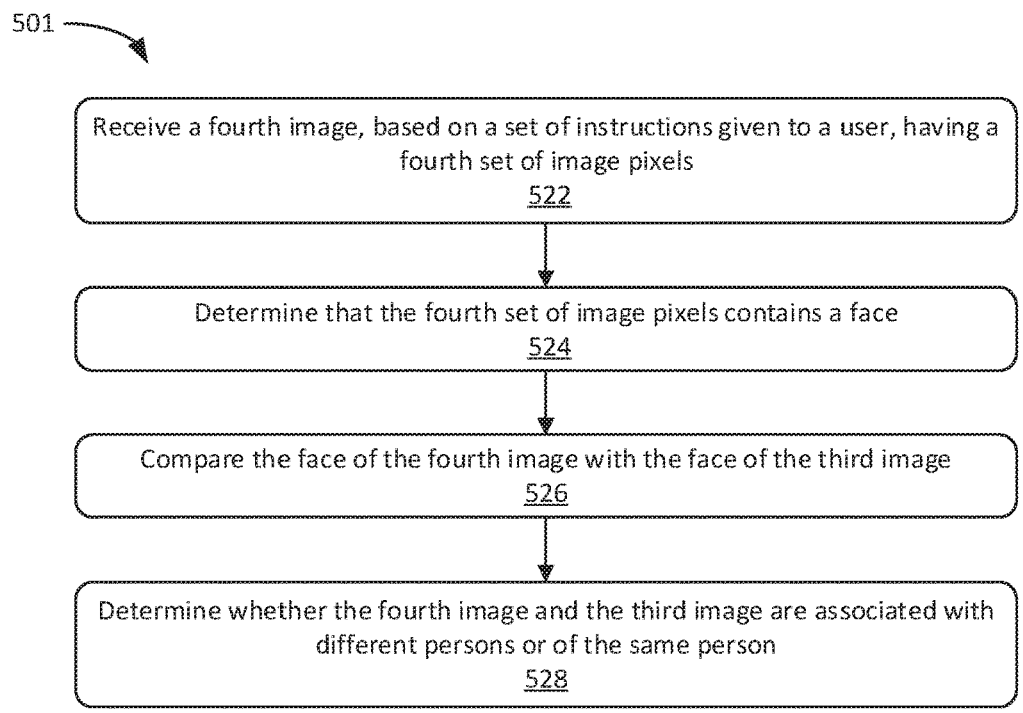

FIGS. 5A-B illustrate flow diagrams of example processes for verifying an identity of a person in accordance with various aspects of the subject technology.

In the example flow diagram 500 of FIG. 5A, at block 502, a computer-implemented system can receive a first image having a first set of image pixels.

At block 504, the computer implemented system can determine that the first set of image pixels contains a first side of an authentication document having an image of a face and one or more identification indicators.

At block 506, the computer implemented system can receive a second image having a second set of image pixels.

At block 508, the computer implemented system can determine that the second set of image pixels contains a second side of an authentication document of the second image having one or more identification indicators.

At block 510, the computer implemented system can determine whether the first side of the authentication document of the first image and the second side of the authentication document of the second image are associated with a same document.

At block 512, the computer implemented system can receive a third image having a third set of image pixels.

At block 514, the computer implemented system can determine that the third set of image pixels contains a face.

At block 516, the computer implemented system can compare the face of the third image with the image of the face of the first image and determine whether the third image and the first image are associated with different persons or a same person.

And at block 518, the computer implemented system can verify an identity of the person based on at least, in part, one of the first, second, and third images Optionally, the computer-implemented system described in FIG. 5A can perform additional steps illustrated FIG. 5B. In the example flow diagram 501 of FIG. 5B, at block 522, a computer-implemented system can receive a fourth image, based on a set of instructions given to a user, having a fourth set of image pixels.

At block 524, the computer implemented system can determine that the fourth set of image pixels contains a face.

At block 526, the computer implemented system can compare the face of the fourth image with the face of the third image.

And at block 528, the computer implemented system can determine whether the fourth image and the third image are associated with different persons or of the same person.

Figure 6A:
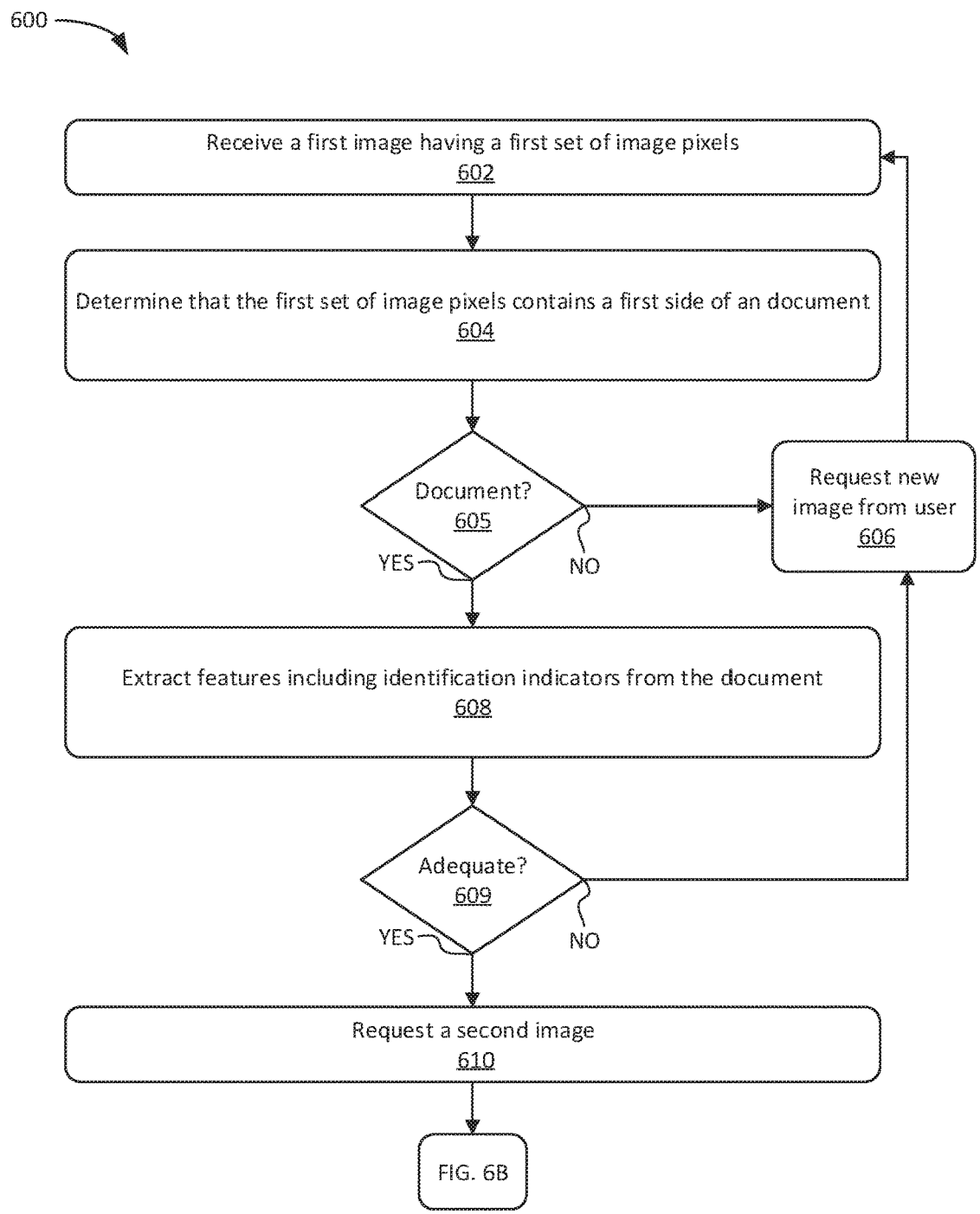
FIGS. 6A-6C illustrate additional flow diagrams of an example process for verifying an identity of a person in accordance with various aspects of the subject technology.
Figure 6B:
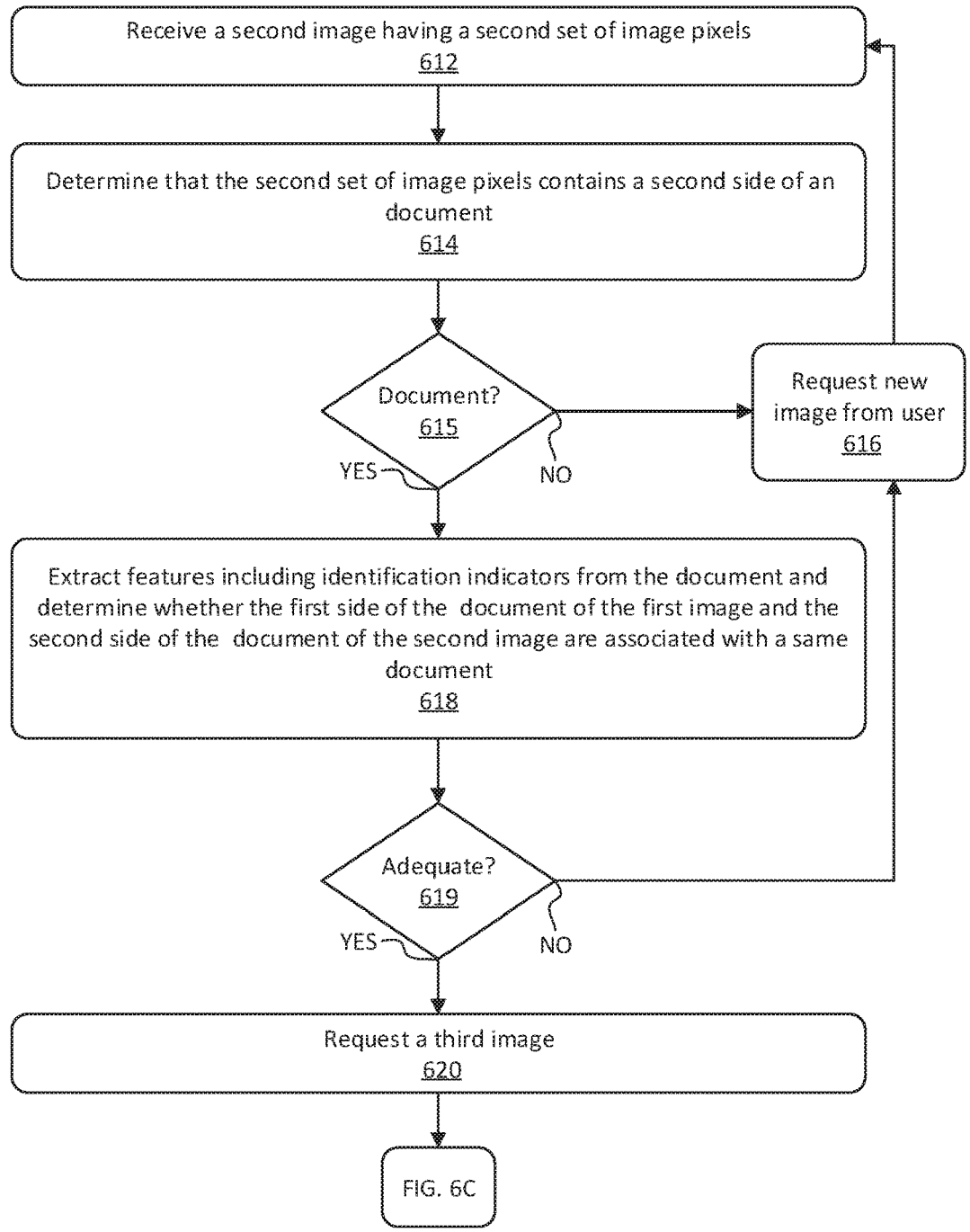
Figure 6C:
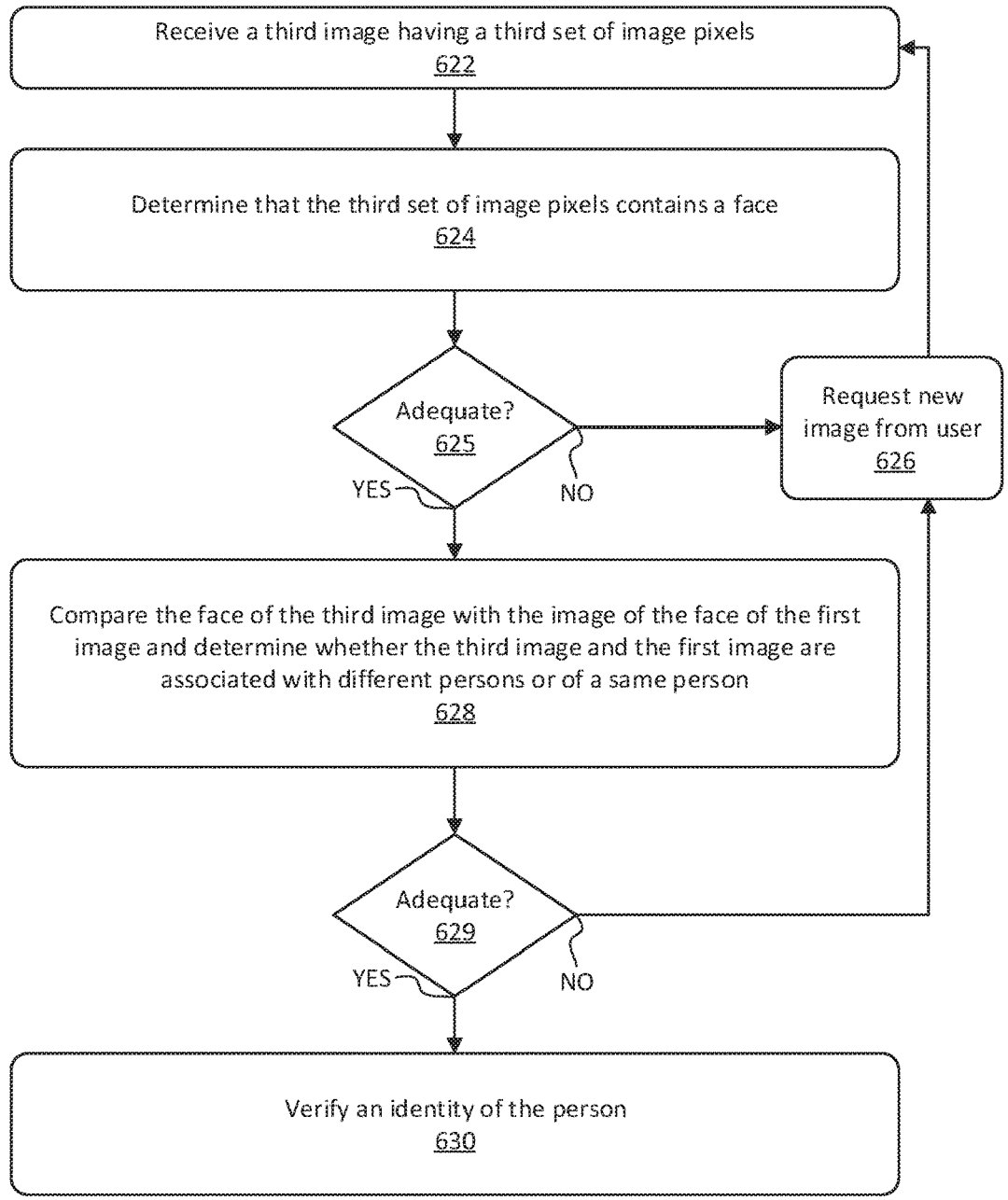

FIGS. 6A-C, combined, illustrate an additional flow diagram of an example process for verifying an identity of a person in accordance with various aspects of the subject technology.

In the example flow diagram 600 of FIGS. 6A-C, according to FIG. 6A, at block 602, a computer-implemented system can receive a first image having a first set of image pixels.

At block 604, the computer implemented system can determine that the first set of image pixels contains a first side of a document.

At decision block 605, the computer implemented system can determine whether document is legible, whether there is a picture of a human face in the document, whether the full document of the first side is in view of the first image, whether there is text, symbols, or other features of the document, or a combination thereof. If a number of the above described are unsatisfactory, such that the system cannot determine that the first image is in fact an image of a first side of a document, the system, at block 606, can requests a new image from the user so that the system will receive another image of a first side of a document. If the system does determine that the first image is in fact an image of a first side of a document, then the system will prompt to perform the next step.

At block 608, the computer implemented system can extract features including identification indicators from the document. In this step of the process 600, the system can extract feature of the first side of the document. If the document is an identification or an authentication document like that of a driver's license, identification card, passport, or similar document, the system can extract identification indicators from the first image. For example, the system can extract textual features relating to a class of identification such as a state issued driver's license, a sub class of identification from the class of identification such as the specific state indicated, type of identification such as a driver's license or a meal card, character and number text fields such as date of birth of the person associated with the document, age, height, name, expiration date of the authentication document, etc. The system can also detect engravings for identifying the type or issuing agency or authority of the document, detect symbols, signatures, and other identification fields.

At decision block 609, the computer implemented system can determine whether the features of the document or identification indicators of the document were adequately extracted. The determination of adequacy can include whether the text of the first side of the document was legible, any symbols, engravings, or pictures identifying a face or body of a person was optically machine readable, etc. If a number of the above described are inadequate, such that the system cannot determine a predetermined set of identification indicators that need to be determined, the system, at block 609 and 606, can reject the first image having a first side of the document that was verified as an adequate document but not legible to extract the predetermined set of identification indicators and request a new image from the user. For example, a predetermined set of identification indicators that need to be satisfied in order for system to move on and not request another image of a first side of a document can include determining and extracting features of a face in the image, determining and extracting a date of birth of a person associated with the document, determining and extracting an identification or document number (for example in a passport, the passport number), determining and extracting a first and last name of the person associated with the document, and an expiration date of the document. For example, once each and all of the content of the picture or photograph, date of birth, first and last name, ID number, and expiration date have been extracted, the system can move on to the next step, otherwise if till reject and ask for another, clearer or more legible, picture of the first side of the document so that the predetermined requirements can be extracted and satisfied. Note, the hypothetical description above is only an example and the predetermined threshold for determining that the extracted features or identification indicators are adequate to move on to a next step can be arbitrary and set to any number or combination of features.

At 610, once the system has extracted an adequate number of features or identification indicators from the first side of the document, the system can request a second image.

In the next step of process 600, according to FIG. 6B, at block 612, the system can receive a second image having a second set of image pixels.

At block 614, the computer implemented system can determine that the second set of image pixels contains a second side of a document.

At decision block 615, the computer implemented system can determine whether the document in the second image is legible, whether there is a picture of a human face in the document, whether there is text, symbols, or other features of the document, or a combination thereof. If a number of the above described are unsatisfactory, such that the system cannot determine that the second image is in fact an image of a second side of a document, or in another example, a document at all, the system, at block 616, can requests a new image from the user so that the system will receive another image of a second of a document. If the system does determine that the second image is in fact an image of a second side of a document, or any side of a document then the system will prompt to perform the next step.

At block 618, the computer implemented system can extract features including identification indicators from the document. In this step of the process 600, the system can extract feature of the second side of the document. If the document is an identification or an authentication document like that of a driver's license, identification card, passport, or similar document, the system can extract identification indicators from the second image. For example, the system can extract textual features relating to a class of identification such as a state issued driver's license, a sub class of identification from the class of identification such as the specific state indicated, type of identification such as a driver's license or a meal card, character and number text fields such as date of birth of the person associated with the document, age, height, name, expiration date of the authentication document, etc. The system can also detect engravings for identifying the type or issuing agency or authority of the document, detect symbols, signatures, and other identification fields.

At decision block 619, the computer implemented system can determine whether the features of the document or identification indicators of the document were adequately extracted. The determination of adequacy can include whether the text of the second side of the document was legible, any symbols, engravings, or pictures identifying a face or body of a person was optically machine readable, etc. In one example, the determination of adequacy can include whether a barcode can be identified and scanned by the computer-implemented system. If a number of the above described are inadequate, such that the system cannot determine a predetermined set of identification indicators that need to be determined, or that the barcode cannot be decoded due to a barcode not existing in the second image or is not readable by the system, the system, at block 619 and 616, can reject the second image having a second side of the document as ineligible for extracting the predetermined set of identification indicators and request a new image from the user. For example, a predetermined set of identification indicators that need to be satisfied in order for system to move on and not request another image of a second side of a document can include determining and extracting features of a face in the image, determining and extracting a date of birth of a person associated with the document, determining and extracting an identification or document number (for example in a passport, the passport number), determining and extracting a first and last name of the person associated with the document, and an expiration date of the document. In another example, a predetermined set of identification indicators that need to be satisfied in order for the system to move on and not request another image of a second side of a document can include identifying a barcode and extracting features of the barcode and decoding the bar code. In this example, once a barcode is identified and decoded, an adequate barcode, at least in form, format, and style, but not necessarily in content, along with a proper decoding of the barcode will generate a payload of the barcode such that the system can read text and number of the payload associated with the barcode.

In this example, if the barcode cannot be decoded or the system cannot generate a payload of the barcode, the system will reject the second image and request another new image from the user. The hypothetical description above is only an example and the predetermined threshold for determining that the extracted features or identification indicators are adequate to move on to a next step can be arbitrary and set to any number or combination of features.

Additionally, at block 618, the computer implemented system can determine whether the first side of the document of the first image and the second side of the document of the second image are associated with a same document. In this step, once an adequate barcode is identified, decoded, and a payload is generated, the system can identify identification indicators in the payload, like that of the identification indicators from the first image of a first side of a document. For example, the system can determine whether certain identification indicators are present in the payload including determining and extracting a date of birth of a person in the payload, determining and extracting an identification or document number (for example in a passport, the passport number), determining and extracting a first and last name of the person, an expiration date in the payload, or a combination thereof. Once any or all of the date of birth, ID number, first and last name, or expiration date are extracted from the payload, the system can compare the above identification indicators with that of the identification indicators identified from the first image of the first side of the document. If the identification indicators from the first image and a second image are a match, then the system can determine that the first image and the second image are a first and second side of a same identification document. If the identification indicators are not a match, either in its entirety or individual identification indicator, then the system can determine either that the first image and second image uploaded to the system are of different documents and indicate that a fraudulent action has taken place, or that at least one of the first image or second image is of a picture of a fraudulent or invalid document. If the first and second image are a match, the system can move forward to the next step. If the images do not match, the system can indicate that a mistake, error, invalidity, or fraud has taken place. In one example, the system may prompt the user to upload a new image of a second side of a document.

At block 620, once the system has extracted an adequate number of features or identification indicators and has determined that the first image and second image as both associated with the same document, the system can request a third image.

In the next step of process 600, according to FIG. 6C, at block 622, the system can receive a third image having a third set of image pixels.

At block 624, the computer implemented system can determine that the third set of image pixels contains a face. The face can be a face of a human. The image can also be a self-portrait, or "selfie" photo of a person.

At decision block 625, the computer implemented system can determine whether the third image in fact has an image of a face and that the face is legible, such that features of the face can be adequately extracted. If the system cannot determine that the third image is in fact an image of a face or a face with optically readable features, the system, at block 626, can request a new image from the user so that the system will receive another image of the face. If the system does determine that the third image is in fact an image of a face, the system will prompt to perform the next step.

At block 628, the computer implemented system can compare the face of the third image with the image of the face of the first image and determine whether the third image and the first image are associated with different persons or of a same person. In this step, the system will extract features of the face as to identify a unique person associated with the face. The system can compare the features of the face with the features extracted of the face from the first image, even if the images are not identical, and determine whether the two faces from the first image and the second image are associated with the same person.

At block 628, if the system determines that the two faces are not of the same person, the system, at block 626 can request for another image. Alternatively, if the system determines that the two faces are not of the same person, the system can indicate that a fraudulent action has taken place, based on the fact that the face analyzed in the third image requested does not match the face analyzed from the first image. If the system determines that there is a match between the face analyzed in the third image and the face analyzed in the first image, the system can perform the next step.

And at block 630, once the system recognizes that there is a match between the third image and the first image, as well as a match of content between the second image and the first image, the system can verify an identify of the person. In this case, the system can indicate that the first side of the document in the first image is associated with the same document as that of the second side of the document in the second image, that the document is an identification or authentication document, and that the third image is of a person associated with the person associated with the identification document.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments can be performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claim standing on its own to represent separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A computer-implemented method of real-time verification of a person, the method comprising:
    receiving a first image having a first set of image pixels;
    determining that the first set of image pixels contains a first side of an authentication document having an image of a face and one or more identification indicators;

receiving a second image having a second set of image pixels;

determining that the second set of image pixels contains a second side of an authentication document of the second image having one or more identification indicators;

determining whether the first side of the authentication document of the first image and the second side of the authentication document of the second image are associated with a same document;

receiving a third image having a third set of image pixels;

determining that the third set of image pixels contains a face;

comparing the face of the third image with the image of the face of the first image;

determining whether the third image and the first image are associated with different persons or of a same person;

receiving a fourth image, based on a set of instructions given to a user, having a fourth set of image pixels;

determining that the fourth set of image pixels contains a face;

comparing the face of the fourth image with the face of the third image;

determining whether the fourth image and the third image are associated with different persons or of the same person;

separating a background of the third image from the face of the third image;

separating a background of the fourth image from the face of the fourth image;

comparing the background of the third image with the background of the fourth image;

determining whether the backgrounds of the third and fourth images are associated with a same spatial environment, a same or similar temporal environment, or a combination thereof; and verifying an identity of the person based on at least, in part, one of the first, second, third, and fourth images.

2. The method of claim 1 further comprising determining that the first set of image pixels includes an entirety of the first side of the authentication document.

3. The method of claim 1 further comprising determining that the first side of the authentication document is optically machine readable.

4. The method of claim 1 wherein the one or more identification indicators includes facial features of a person associated with the authentication document.

5. The method of claim 4 further comprising extracting the facial features of the person associated with the authentication document.

6. The method of claim 1 wherein the one or more identification indicators includes an identification class, document class, or identification type.

7. The method of claim 6 further comprising determining the identification class, document class, identification type, or a combination thereof.

8. The method of claim 1 wherein the one or more identification indicators includes character text, number text, symbols, signatures, engravings, or a combination thereof.

9. The method of claim 8 further comprising extracting and analyzing the character text, number text, symbols, signatures, engravings, or a combination thereof.

10. The method of claim 1 wherein the one or more identification indicators includes one or more document identification numbers.

11. The method of claim 10 further comprising extracting the one or more document identification numbers.

12. The method of claim 1 wherein the one or more identification indicators includes one or more name fields, date of birth fields, document expiration dates, or a combination thereof.

13. The method of claim 12 further comprising extracting the one or more name fields, date of birth fields, document expiration dates, or a combination thereof.

14. The method of claim 1 further comprising determining that the first image received is that of a capture image from an image capture device.

15. The method of claim 1 further comprising determining that the first image received is that of a physical authentication document.

16. The method of claim 1 further comprising determining that the authentication document is compliant with at least one document issuing authority.

17. The method of claim 1 further comprising determining that the second set of image pixels includes an entirety of the second side of the authentication document of the second image.

18. The method of claim 1 further comprising determining that the second side of the authentication document of the second image is optically machine readable.

19. The method of claim 1 wherein the one or more identification indicators includes a barcode associated with the authentication document of the second image.

20. The method of claim 19 wherein the barcode is a single or multidimensional code.

21. The method of claim 19 wherein the barcode is a PDF417 compliant barcode.

22. The method of claim 19 further comprising decoding and analyzing the barcode of the authentication document of the second image.

23. The method of claim 22 further comprising detecting, based on analyzing the decoded barcode, one or more identification fields in the authentication document of the second image.

24. The method of claim 23 further comprising:

comparing the one or more identification fields of the second side of the authentication document of the second image with the one or more identification indicators of the first side of the authentication document of the first image;

determining that the one or more identification fields of the second side of the authentication document of the second image matches the one or more identification indicators of the first side of the authentication document of the first image; and verifying that the first side of the authentication document of the first image and the second side of the authentication document of the second image are associated with a same document.

25. The method of claim 1 further comprising determining that the second image received is that of a capture image from an image capture device.

26. The method of claim 1 further comprising determining that the second image received is that of a physical authentication document.

27. The method of claim 1 further comprising determining that the third image is a capture image from an image capture device.

28. The method of claim 27 further comprising determining that the capture image of the third image is not a screenshot of the first image or a capture image of the first image.

29. The method of claim 1 further comprising detecting whether the face of the third image is an identical copy of the image of the face of the first image.

30. The method of claim 1 further comprising determining, based on one or more detected features of the face of the fourth image, whether the set of instructions given to the user have been satisfied.

31. The method of claim 1 further comprising generating a machine learning model configured to determine the spatial environment of a background of an image and determine whether the background of the third image and the background of the fourth image are the same spatial environment.

32. The method of claim 1 wherein the same authentication document is a personal identification document including a driver's license, identification card, or a passport.

* * * * *